(12) United States Patent
Haertel et al.

(10) Patent No.: US 7,784,826 B2
(45) Date of Patent: Aug. 31, 2010

(54) GAS BAG MODULE FOR A VEHICLE OCCUPANT RESTRAINT SYSTEM

(75) Inventors: Achim Haertel, Mutlangen (DE); Klaus Bernhard, Spraitbach (DE); Bernd Issler, Urbach (DE); Uli Vielhuber, Mutlangen (DE); Winfried Grauer, Aalen (DE)

(73) Assignee: TRW Automotive GmbH, Alfdorf (DE)

( * ) Notice: Subject to any disclaimer, the term of this patent is extended or adjusted under 35 U.S.C. 154(b) by 0 days.

(21) Appl. No.: 11/827,291

(22) Filed: Jul. 11, 2007

(65) Prior Publication Data

US 2008/0012272 A1    Jan. 17, 2008

(30) Foreign Application Priority Data

Jul. 12, 2006    (DE)    ........................ 10 2006 032 253

(51) Int. Cl.
*B60R 21/16*    (2006.01)
(52) U.S. Cl. ...................................................... 280/731
(58) Field of Classification Search .................. 280/731
See application file for complete search history.

(56) References Cited

U.S. PATENT DOCUMENTS 5,110,647 A * 5/1992 Sawada et al. ................. 428/43
5,641,554 A * 6/1997 Koizumi et al. .............. 428/131

* cited by examiner

*Primary Examiner*—Faye M. Fleming
(74) *Attorney, Agent, or Firm*—Tarolli, Sundheim, Covell & Tummino LLP

(57) ABSTRACT

A gas bag module (10) for a vehicle occupant restraint system comprises a housing with a gas generator support (17) and a covering (26). The housing consists at least partly of a thermoplastic elastomer. The thermoplastic elastomer is foamed using a physical or chemical foaming agent.

9 Claims, 1 Drawing Sheet

GAS BAG MODULE FOR A VEHICLE OCCUPANT RESTRAINT SYSTEM

TECHNICAL FIELD

The invention relates to a gas bag module for a vehicle occupant restraint system.

BACKGROUND OF THE INVENTION

The gas bag module of a vehicle occupant restraint system usually comprises a housing with a support piece for a gas generator and a covering for the gas bag which is held in the housing. The support piece and the covering may be constructed as separate components or may be formed integrally with further housing parts. High requirements are set with regard to the components of the gas bag module, owing to their being arranged visibly in the vehicle and their particular function of bearing loads or resisting high forces. For this reason, the housing parts such as coverings and gas generator supports have been produced up until now from metal or from a compactly injected plastic.

From DE 43 38 666 A1, an airbag housing is known which is produced in one piece by injection moulding. A pourable light metal alloy or a plastic which is able to be injection-moulded is used as the material for the airbag housing.

In DE 195 46 585 A1 a gas bag covering is described which has as a main component one or more layers of elastomer alloys which are joined to each other. The elastomer alloys consist of mixtures of a thermoplastic polymer with a non-cross-linked, partially cross-linked or fully cross-linked EPDM terpolymer, block copolymers of alternating polyester and polyether blocks or block copolymers of polystyrene and polyolefins. A tear line up to a predetermined residual wall thickness is introduced into the inner side of the covering by means of a laser.

Gas bag modules in which the covering is formed from a soft thermoplastic elastomer and the other housing parts consist of a hard plastic, for example a polyamide or polypropylene reinforced with glass fibres, are also commercially available.

A method for producing foamed thermoplastic elastomers is known from EP 1 090 065 B1.

However, the components of the gas bag module produced from a metal or from compactly injected plastics have a high weight. Furthermore, a certain inaccuracy in the components may occur with regard to the components produced from compactly injected plastics. Distortion and material shrinkage during the cooling of the molten plastic in the injection moulding tool are regarded as the cause of this inaccuracy in the components. Owing to differences in wall thickness in bending and hinged areas and also in the region of ribs and tear lines or other sudden changes in the wall thickness, deformations, shrink marks and blemishes therefore appear on the surface which are particularly not desired in gas bag module coverings and require a reworking of the workpiece.

SUMMARY OF THE INVENTION

The object of the invention is to propose a gas bag module which is able to be produced as simply and at as favourable a cost as possible, taking into account the aspects mentioned, and which in addition is as light as possible, without functional disadvantages having to be accepted.

To achieve this object, a gas bag module for a vehicle occupant restraint system is proposed according to the invention, which comprises a housing with a support piece for a gas generator and with a covering for a gas bag held in the housing, wherein at least a part of the housing consisting of a thermoplastic elastomer, and wherein the thermoplastic elastomer is foamed using a physical or chemical foaming agent.

Through the use of a foamed thermoplastic elastomer in the manufacture of the housing parts of the gas bag module, their densities are reduced compared with components made of compactly injected plastics or metal. The gas bag module according to the invention therefore has a lower weight than the comparable components from the prior art. The component costs are also lower because of the lower consumption of material. At the same time, a compensation takes place of the material shrinkage occurring during the cooling of the molten plastic in the injection moulding mould through the gas bubbles formed by the physical or chemical foaming agent. The gas bubbles produce a counter-pressure in the foamed thermoplastic elastomer, which compensates for a deformation of the surface of the component caused by material shrinkage. The components therefore have improved visual characteristics and a better accuracy of fit. At the same time, the known good mechanical characteristics of the thermoplastic elastomers, which are used as the starting material, can be maintained. The components produced from thermoplastic elastomers which are foamed according to the invention are therefore inherently stable under the ambient conditions and are able to receive high loads. In the case of activation, the reduced weight of the components of the gas bag module according to the invention additionally leads to a lower stressing of hinges and other connecting elements owing to the smaller masses which are to be moved, so that the risk of parts of the module separating is also reduced.

The thermoplastic elastomer is preferably selected from the group consisting of thermoplastic polyurethane elastomers (TPE-U), thermoplastic polyamide elastomers (TPE-A), thermoplastic polyester elastomers (TPE-E), thermoplastic polyolefin elastomers (TPE-O) or thermoplastic styrene block copolymers (TPE-S). Block copolymers which are composed of alternating hard polyester blocks and soft polyether blocks are particularly suitable as thermoplastic polyester elastomers. The polyester blocks are formed here from diols, preferably 1,4-butane diol, and dicarboxylic acids, preferably terephthalic acid. The polyester blocks are esterified with polyethers carrying long chain, terminal hydroxyl groups to produce the block copolymers. Block copolymers of polystyrene and polyolefins are particularly suitable as thermoplastic styrene block copolymers. These are characterized by their triple block structure of two thermoplastic polystyrene end blocks and one elastomer central block of polyolefin. The styrene-butadiene-styrene block copolymers, styrene-isoprene-styrene block copolymers or styrene-ethylene-butadiene-styrene block copolymers and their hydrogenated derivatives are preferably used as TPE-S. In these "TPE-S" block copolymers, the hard polystyrene segments form regions with a uniform substance characteristic so-called "domains", which act as three-dimensional, physical cross-linking sites for the flexible, soft polyolefin segments. The foamed thermoplastic elastomers can be fully or partially cross-linked according to the known methods of dynamic vulcanization. Sulphur or compounds containing sulphur, such as disulphur dichloride, peroxides and cross-linking agents based on silicon are particularly suitable as cross-linking agents.

The physical foaming agent is preferably nitrogen, carbon dioxide or a low boiling hydrocarbon. In physical foaming agents, the foaming of the thermoplastic elastomer is achieved by changing the state of aggregation of the foaming agent, i.e. by evaporating a liquid or, if the foaming agent is a gas, by its expansion.

The chemical foaming agent is preferably ammonium bicarbonate, an azodicarboxylic acid amide, a N-nitroso compound or a sulphonyl hydrazide. These compounds are distinguished in that they decompose at an increased temperature or convert through chemical reaction. The reaction products generated in this process form the foaming agent necessary for foaming. For example, the compounds known from EP 1 090 065 A1, which separate water on heating, such as for example metal hydroxides or metallic salts containing water of crystallization are also suitable as the foaming agent. These compounds are usually used together with the chemical or physical foaming agents described above.

According to a first embodiment of the invention, at least the covering of the gas bag module consists of the foamed thermoplastic elastomer, whereas the remaining housing parts such as the generator support and/or frame parts may be formed from the hard plastics, possibly reinforced with fibres, which are usually used, such as polyamide or polypropylene. In a further embodiment of the invention, provision may be made that at least the generator carrier consists of the foamed thermoplastic elastomer and the covering is formed in a conventional manner from compactly injected plastics.

Preferably, however, the entire gas bag module housing with the covering and the gas generator carrier consists of the foamed thermoplastic elastomer. This leads not only to a saving on material and hence on cost, but also to a reduction in cycle time, because only one working step is required to produce the module housing.

It is to be understood that the thermoplastic elastomer may contain conventional fillers, fireproofing agents, pigments, dyes and further additives which are used in such elastomers.

The invention additionally relates to a method for the production of a housing for a gas bag module, in which a thermoplastic elastomer is plasticized in an injection moulding machine and is introduced into a mould for the gas bag module housing, and which is characterized in that the plasticized thermoplastic elastomer contains a chemical or physical foaming agent and hardens in the mould, forming a housing part made of a foamed thermoplastic elastomer. In this way, components are obtained in manufacture which are almost free of distortion and do not require any further finishing.

Further advantages of the method according to the invention lie in that the cycle time during manufacture of the foamed housing parts can be reduced owing to the stronger nucleating of the molten plastic, i.e. the components of the injection-moulded foamed thermoplastic elastomers harden more quickly. Long flow paths in the injection moulding machine are also possible, because the foamed thermoplastic elastomers have a lower viscosity and therefore fill the mould more easily.

BRIEF DESCRIPTION OF THE DRAWINGS

Further advantages of the invention will be apparent from the following description of an example embodiment in connection with the enclosed drawings, in which.

DETAILED DESCRIPTION OF PREFERRED EMBODIMENTS

Figure 1:
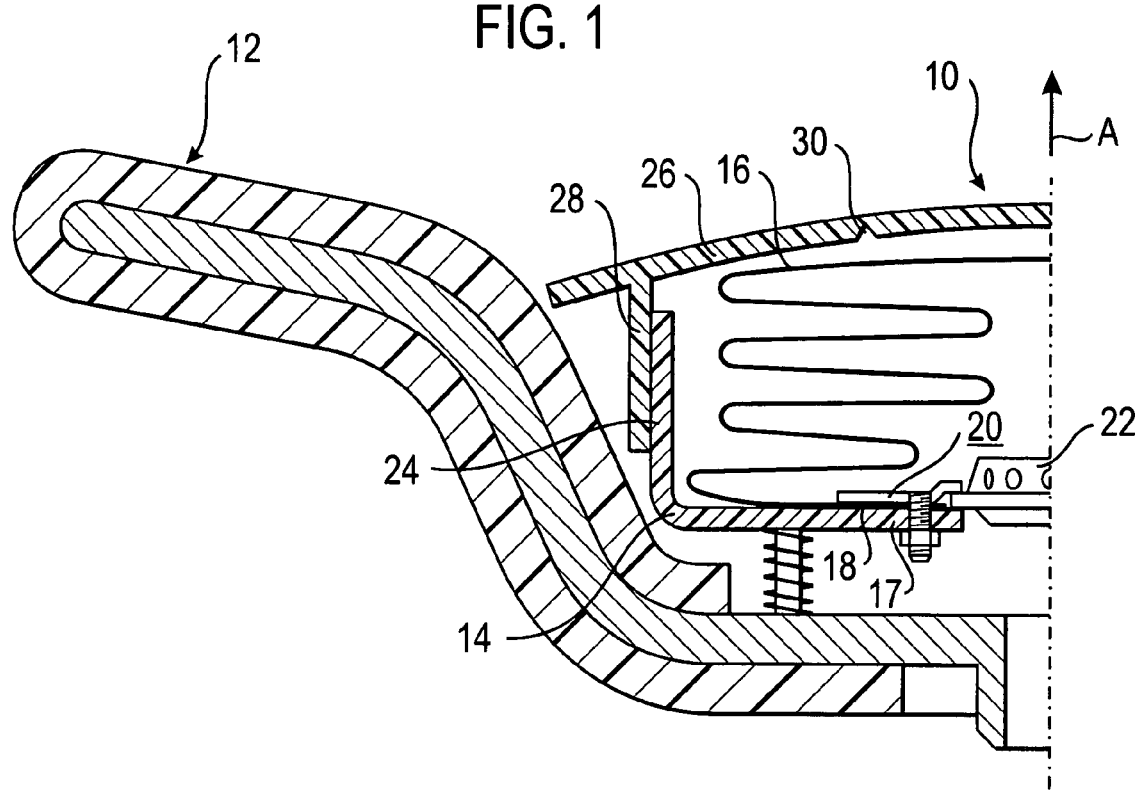
FIG. 1 shows a diagrammatic semilateral sectional view of a gas bag module according to the invention.

FIG. 1 shows a gas bag module 10, which is inserted into a steering wheel 12. The gas bag module 10 contains a folded gas bag 16 held in a cup-shaped housing part 14. A rim 18 of an inflation opening of the gas bag 16 lies between a base 17 of the housing part 14 and a separate, ring-shaped gas bag holding element 20. The base 17 of the housing part 14 serves as a support piece for a gas generator 22 and has an opening into which the gas generator 22 is inserted with a ring-shaped flange which is likewise arranged between the gas bag holding element 20 and the base 17 of the housing part 14. The housing part 14 has in addition a side wall 24 extending from the base 17 substantially in the axial direction A. A covering 26 is arranged as a further housing part over the gas bag 16 and the cup-shaped housing part 14, the covering 26 having formed-on supports 28 at which the covering 26 is connected with the side wall 24 of the housing part 14. One or more tear lines 30 are introduced into the covering 26 as predetermined breaking points at which the covering is torn open by the unfolding gas bag 16 in the case of activation.

In the embodiment shown here, the base 17 and the side wall 24 of the housing part 14 are constructed integrally with each other. However, provision may also be made to construct the side wall 24 as a separate frame part of the gas bag module housing. For example the supports 28 of the covering 26 may be formed integrally onto such a frame part.

The housing of the gas bag module 10 with the cup-shaped housing part 14 and the covering 26 consists wholly or partially of a thermoplastic elastomer which is selected from the group consisting of thermoplastic polyurethane elastomers, thermoplastic polyamide elastomers, thermoplastic polyester elastomers, thermoplastic polyolefin elastomers or thermoplastic styrene block copolymers, and which is foamed during the manufacture of the module housing in the injection moulding tool, using a physical or chemical foaming agent.

Figure 2:
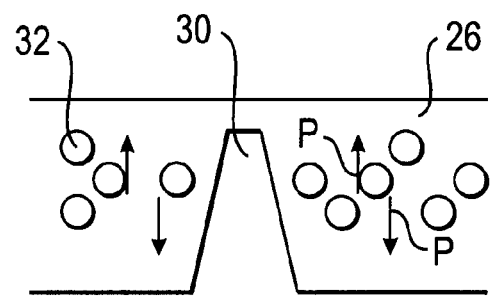
FIG. 2 shows a diagrammatic illustration of the principle forming the basis of the invention with the aid of a portion of a covering of the gas bag module of FIG. 1 in the region of a tear line.

FIG. 2 shows a portion of the covering 26 of FIG. 1 in the region of the tear line 30. In this region, the tractive forces of differing intensity occurring due to material shrinkage during the cooling of the molten plastic in the injection moulding tool may lead to a deformation of the surface of the covering 26. However, in the components of foamed thermoplastic elastomers according to the invention, the gas bubbles 32 released by the chemical or physical foaming agents produce a counter-pressure, illustrated here by the arrows P, which compensates for this surface deformation.

The production of the housing parts of the gas bag module takes place in conventional injection moulding machines. For this, at least one physical or chemical foaming agent is admixed with the thermoplastic elastomer. In the case of the chemical foaming agent, e.g. an azodicarboxylic acid amide, the admixing to the thermoplastic elastomer takes place before introduction into the injection moulding machine, and in the case of the physical foaming agent, e.g. of nitrogen or carbon dioxide, the admixing to the melt of the elastomer takes place either in the plasticizing aggregate or in front of the screw tip in the injection moulding machine.

If a chemical foaming agent is used, then as much heat is supplied to the foaming agent during the plasticizing of the thermoplastic elastomer in the cylinder of the injection moulding machine for the foaming agent to decompose. Whilst flowing into the tool, the melt of the thermoplastic elastomer expands owing to the counter-pressure no longer being present, and gas bubbles occur in the melt. These produce a counter-pressure in the foamed thermoplastic elastomer, which counteracts the tractive forces occurring during the cooling of the molten plastic, and compensates for a deformation of the surface of the component caused by material shrinkage.

With the use of physical foaming agents, the direct gas-injection method is particularly suitable for the production of the components, in which nitrogen or carbon dioxide is admixed in the supercritical state to the melt. Components produced according to this method consist of closed-cell micro-structure foams with a very fine foam core.

Through the present invention, components can therefore be provided having a compact low-pore outer skin and a foamed core, and which are almost free of distortion, do not have any deformation of the surface of the component and also have a lower weight than components of the prior art.

The invention claimed is:

1. A gas bag module (10) for use in a vehicle occupant restraint system, comprising a housing (14, 26) and a gas bag (16) held in the housing, wherein the housing has a covering (26) for said gas bag and a gas generator support piece (17) connected to said covering, and wherein at least one of said support piece and said covering comprises only a single layer of material that consists of a thermoplastic elastomer having a first surface exposed to the interior of the housing (14, 26) and a second surface exposed to the exterior of the housing (14, 26), the thermoplastic elastomer being foamed using a physical or chemical foaming agent.

2. The gas bag module according to claim 1, wherein the thermoplastic elastomer is selected from the group consisting of thermoplastic polyurethane elastomers, thermoplastic polyamide elastomers, thermoplastic polyester elastomers, thermoplastic polyolefin elastomers or thermoplastic styrene block copolymers.

3. The gas bag module according to claim 1, wherein the physical foaming agent is nitrogen, carbon dioxide or a low boiling hydrocarbon.

4. The gas bag module according to claim 1, wherein the chemical foaming agent is ammonium bicarbonate, an azodicarboxylic acid amide, a N-nitroso compound or a sulphonyl hydrazide.

5. The gas bag module according to claim 1, wherein the support piece (17) of the housing consists of the foamed thermoplastic elastomer.

6. The gas bag module according to claim 1, wherein the covering (26) of the housing consists of the foamed thermoplastic elastomer.

7. The gas bag module according to claim 1, wherein the entire housing (14, 26) consists of the foamed thermoplastic elastomer.

8. A method for the production of a housing for a gas bag module comprising the steps of:
  plasticizing a thermoplastic elastomer in an injection moulding machine;
  introducing said plasticized thermoplastic elastomer into a mould for the gas bag module housing;
  foaming the plasticized thermoplastic elastomer with a chemical or physical foaming agent; and
  hardening the foamed thermoplastic elastomer in the mould to form a housing comprising only a single layer of material, the single layer of material consisting of a foamed thermoplastic elastomer having a first surface exposed to the interior of the housing (14, 26) and a second surface exposed to the exterior of the housing (14, 26).

9. A gas bag module (10) for use in a vehicle occupant restraint system, comprising a housing (14, 26) and a gas bag (16) held in the housing, wherein the housing has a covering (26) for said gas bag and a gas generator support (17) connected to said covering, the housing (14, 26) having a first surface exposed to the interior of the housing (14, 26) and a second surface exposed to the exterior of the housing (14, 26), and wherein the entire housing comprises only a single layer of material, and the single layer of material consists of a thermoplastic elastomer that is foamed using a physical or chemical foaming agent.

* * * * *